April 16, 1935.	G. H. LIMPERT	1,997,643
EVAPORATING APPARATUS FOR LIQUIDS
Filed Nov. 13, 1933
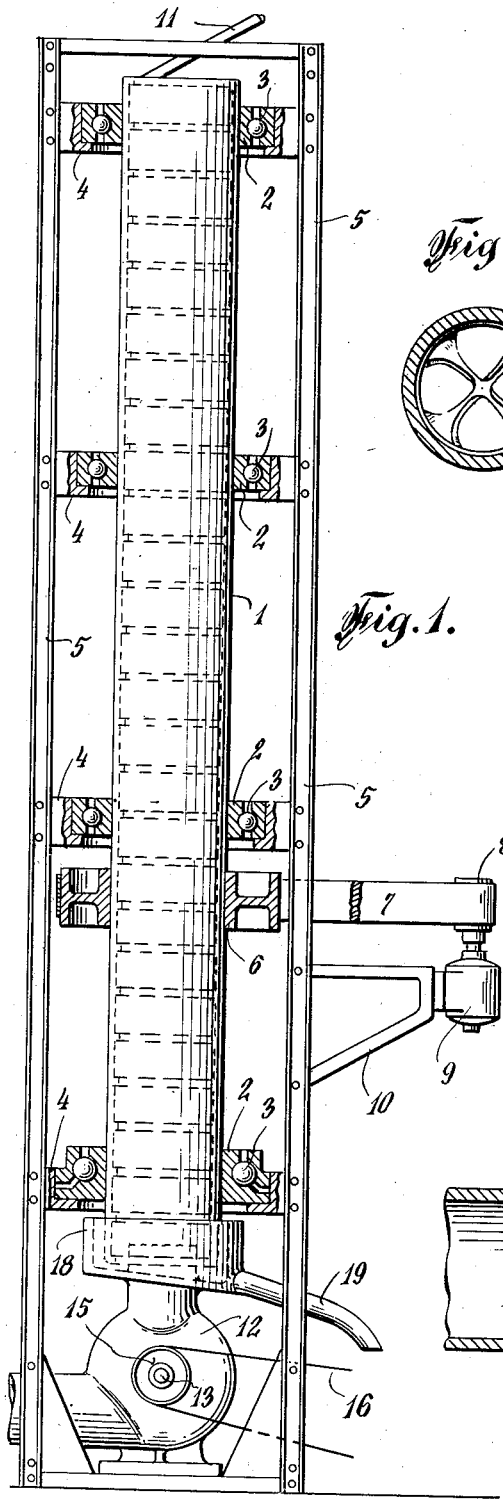
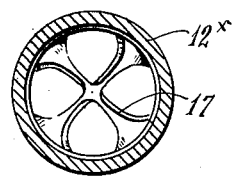
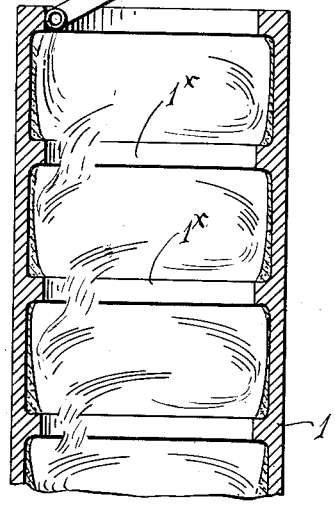
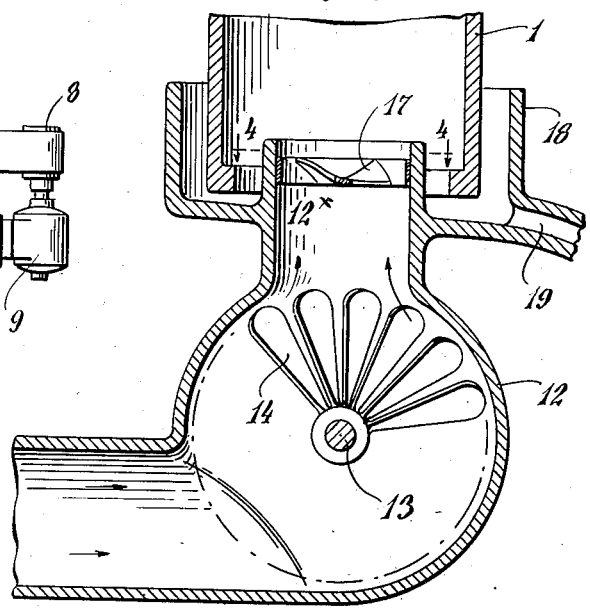

Patented Apr. 16, 1935

1,997,643

UNITED STATES PATENT OFFICE 1,997,643

EVAPORATING APPARATUS FOR LIQUIDS

Gregory H. Limpert, New York, N. Y.

Application November 13, 1933, Serial No. 697,811

4 Claims. (Cl. 159—6)

This invention relates to evaporating apparatus for liquids such as milk, fruit juices, and other liquids for the concentration thereof, and its object is to provide an apparatus of high efficiency and operable when desired without cooking of the liquid, cooking changing the flavor and other characteristics of some liquids, as, for example, milk, so as to impair the quality of the same, or reduce the uses to which the concentrated liquid may be put.

The invention will be described with reference to the accompanying drawing, in which:

Fig. 1 is a view in elevation, partly in section, of an apparatus constructed in accordance with the invention.

Fig. 2 is an enlarged sectional elevation of the upper portion of the apparatus.

Fig. 3 is an enlarged sectional elevation of the lower part of the apparatus.

Fig. 4 is a horizontal section on the line 4—4, Fig. 3.

The embodiment of the invention illustrated in the drawing comprises a cylinder 1, supported on a vertical axis. For convenient rotational support of cylinder 1, I have fixed thereto a plurality of bearing rings 2 connected by suitable bearing members 3 with bearing rings 4 fixed to vertically extending frame members 5.

At a suitable point intermediate its ends, cylinder 1 may carry a pulley 6 connected by a belt 7 with a pulley 8 connected to a motor 9, the latter being suitably supported, as by a bracket 10, the latter, in the present embodiment, being secured to the framework 5.

The inlet end of the cylinder may be open and leading to a point adjacent its inner wall may extend an inlet tube 11 connected with a source of supply for the liquid to be evaporated.

Secured to the inner wall of the cylinder are a plurality of ring-like flanges 1x, and the flanges may be metallic rings welded or otherwise secured to the cylinder, or they may be cast integrally with the cylinder. The flanges are preferably equally spaced one from the other.

The discharge end of cylinder 1 rotates about the neck 12x of a blower of any suitable construction. In the present embodiment, the blower comprises a casing 12 of generally cylindrical form within which is mounted on shaft 13 a fan 14, the shaft carrying exteriorly of casing 12 a pulley 15 rotated by a belt 16 leading to a power element.

Within discharge neck 12x near the top thereof, are deflecting blades 17 so designed as to throw the current of air upwardly in a spiral path. Surrounding the outlet end of cylinder 1 is a collection chamber 18 having a discharge outlet 19 leading to a suitable point of collection for the concentrated liquid.

The length and diameter of the cylinder will generally be in accordance with the character of liquid for the apparatus, as desired. A suitable apparatus for evaporating milk may be eight to ten inches in diameter and approximately ten feet in length, and the flanges within the cylinder may be spaced eight to ten inches apart. A suitable speed of rotation of the cylinder for evaporation of milk may be two hundred revolutions per minute.

The apparatus is designed for use with air forced upwardly from the lower end of the cylinder and discharged at the top thereof, the air being given a moderate degree of heat, as, for example, 120–130° F. and the air may be given a preliminary dehydrating treatment if desired, although, in practice, I have found it entirely feasible merely to bring the air to the approximate temperature stated.

I prefer to feed the liquid, as, for example, milk, at such speed that the milk requires from one to two minutes in its travel from the top of the cylinder to the discharge end thereof, and in such case, it is entirely feasible to procure a desired evaporation of the milk without raising its temperature more than five degrees above the room temperature, i. e., approximately seventy degrees. In such case the dehydrating action upon the milk is effected without changing its flavor and 75% of water may be removed. This is important because the flavor of the milk is not changed and evaporated milk produced by the present apparatus and according to my method, may be brought back to original volume, by adding water, the result being milk of the original consistency and flavor. That the same is true as to fruit juices has been demonstrated by me in connection with the evaporation of fruit juice, as, for example, peach juice, a juice of very delicate flavor.

The air thrown upward by the blower in spiral path is preferably filtered and sterilized and the direction of the spiral is preferably the same direction as that of the rotating cylinder.

Upon the introduction of the liquid intended for evaporation at the top of the rotating cylinder, centrifugal force throws the liquid against the sides of the cylinder and gravity causes the particles of liquid to move downwardly, this downward movement being resisted by the flanges 1x. The liquid therefore assumes a moving film relatively thin immediately below a flange, the film gradually thickening as it approaches an underlying flange and is partially supported thereby. The film thus has a movement of rotation and also a downward movement until it falls into the reception chamber 18. The speed of movement of the film being influenced by gravity, is controlled by the rate of feed of the liquid to the inlet end of the cylinder, the preferred rate of speed for milk being, as I have stated, that which will carry the particles of milk through the cylinder at an interval of one to two minutes. The speed of rotation of the cylinder is at a rate sufficient for exertion of centrifugal force to partially suspend the inflowing liquid in a film around the walls of the cylinder and permit the flow of incoming liquid by discharge of the dehydrated liquid at the base of the cylinder, without disturbing the regularity of the suspended film. The flanges retard the action of gravity upon the inflowing liquid and compel the suspension of the liquid to be in series of successive films, the base of each film being equivalent to the degree of projection of its supporting flange, the film gradually thinning upwards until it reaches its minimum thickness at the top.

While I prefer that the filtered and sterilized air forced through the cylinder be heated, evaporation may commercially be effected at room temperature and the air acts through the ordinary affinity of unsaturated air for moisture, the spiral path of the air enabling every particle thereof to contact with the liquid, the latter being suspended, as stated, in relatively thin films so controlled that the particles of the milk are constantly moving, and hence the formation of "skins" of milk, or overdehydrated areas of fruit juices and other liquids, is entirely avoided. Furthermore, my method and apparatus are ideally operable in connection with evaporation of milk because there is no such beating or agitation of the milk as to tend to separate butter fat, the movement of the milk being a gentle one at all times.

Having described my invention, what I claim and desire to secure by Letters Patent, is as follows:—

1. An evaporator for liquids comprising a vertical cylinder having therein spaced shallow annular flanges at its inner wall, means for admitting liquid to the top of the cylinder against the inner wall thereof, means for rotating the cylinder thereby creating a centrifugal force coacting with said shallow flanges to create successive films of liquid, the films increasing in thickness toward the base area thereof and means for flowing a dehydrating medium through the cylinder.

2. An evaporator for liquids comprising a vertical cylinder, spaced shallow flange-like supports at the inner wall of the cylinder separating liquid treating chambers, means for rotating the cylinder, a collection chamber at the base of the cylinder and a blower at the base of the cylinder operable to force air upwardly through the chambers of the cylinder.

3. An evaporator constructed in accordance with claim 2, in combination with means carried intermediate the cylinder and the blower for directing the air in a spiral path relatively to the inner wall of the cylinder.

4. An evaporator comprising a vertical cylinder carrying on its inner wall a plurality of flange-like rings, means for rotating the cylinder, a liquid collecting chamber surrounding the cylinder at its lower end, a blower casing having an upwardly projecting outlet receiving and supporting said collection chamber, a blower within the casing, means for operating the blower, and an air deflector carried within the casing outlet and adapted to direct the air from the blower in a spiral path within the cylinder, whereby the liquid admitted to the top of the cylinder is thrown against the inner wall thereof by centrifugal action and descends by gravity to the flange-like rings in succession and thence to the collection chamber.

GREGORY H. LIMPERT.